United States Patent [19]

Barach et al.

[11] Patent Number: 4,707,364
[45] Date of Patent: Nov. 17, 1987

[54] COMPOSITION FOR ACCELERATING CHEESE AGING

[75] Inventors: Jeffrey T. Barach; Larry L. Talbott, both of Elkhart, Ind.

[73] Assignee: Miles Laboratories, Inc., Elkhart, Ind.

[21] Appl. No.: 793,776

[22] Filed: Nov. 1, 1985

Related U.S. Application Data

[63] Continuation-in-part of Ser. No. 574,369, Jan. 27, 1984, abandoned.

[51] Int. Cl.$^4$ .................... A23C 19/032; A23C 19/06; C12N 1/20; C12N 1/04
[52] U.S. Cl. ........................................ 426/36; 426/35; 426/38; 435/198; 435/220; 435/223; 435/253; 435/260
[58] Field of Search .................. 426/35, 36, 38, 61, 426/63; 435/198, 220, 223, 253, 260

[56] References Cited

U.S. PATENT DOCUMENTS 3,650,768  3/1972  Roberts .......................... 426/35
4,119,732 10/1978  Kratochril ....................... 426/36
4,158,607  6/1979  Kalinowski et al. ............. 426/36 X
4,172,900 10/1979  Dooley ........................... 426/35 X

FOREIGN PATENT DOCUMENTS 1240345  7/1971  United Kingdom .
1326516  8/1973  United Kingdom .
1377120 12/1974  United Kingdom .

Primary Examiner—David M. Naff
Attorney, Agent, or Firm—Jerome L. Jeffers

[57] ABSTRACT

Aging of cheese is accelerated by adding during cheesemaking a composition containing preserved, partially disrupted L. casei and/or L. lactis, and a dried lipase similar to kid or calf pre-gastric lipase. The L. casei or L. lactis has been preserved by freezing, freeze drying, spray drying or fluidized bed drying. Preferably, the L. casei is ATCC 39539 and the L. lactis is ATCC 39538. The composition may optionally contain a similarly preserved and partially disrupted L. plantarum, and/or a microbial neutral protease. The composition may be added to cheese milk before adding coagulant to coagulate the milk or to curd with salt before pressing.

20 Claims, No Drawings

COMPOSITION FOR ACCELERATING CHEESE AGING

This application is a continuation-in-part of U.S. application Ser. No. 574,369 filed on Jan. 27, 1984 and now abandoned.

BACKGROUND OF THE INVENTION

This invention involves a composition and a method for the accelerated aging of cheese. In particular, the aging of American cheese, e.g. cheddar cheese, colby cheese, monterey and jack cheese can be accelerated by use of the composition disclosed herein. State of the art technology for accelerated cheese aging typically employs 1 of 2 approaches other than just raising the curing temperature. The first approach utilizes selected microorganisms in addition to the conventional cheesemaking ingredients whereas the second approach advocates the use of enzymes, in some cases from the same class of organisms, which are added during the cheese manufacturing process.

Cheese flavor is a complex mixture of several hundred flavor components. The balance is especially critical to obtaining the typical organoleptic preception associated the cheese flavor. Also, associated with aging is body breakdown or softening. The complexity of the flavor and the opportunity for off-flavor development have precluded the commercialization of an effective cheese aging product.

Associated with the aging and flavor development of cheese is the overall hydrolysis of the major components thereof, i.e. the conversion of protein and fat to peptides and free fatty acids, respectively. Much focus has been placed on the role of lipolytic and proteolytic enzymes, e.g. lipases and esterases, from dairy microorganisms and from rennet during the ripening process. The formation of volatile fatty acids is routinely observed during the ripening process, however, the sources of these lipases and esterases are relatively undefined. Some authors assign lipolytic action to the milk lipase while others believe that contaminating microorganisms such as Micrococci sp. are the source of fat hydrolyzing enzymes. Current theories suggest that the flavor components of cheese are not necessarily the direct result of proteolysis and lipolysis, but instead are the result of precursor compounds generated by the gross hydrolysis of casein and fat which have been further converted by relatively obscure pathways.

The balance of flavor components during cheese aging is a very delicate and complex process. Although the process is not well-understood, certain investigators have developed theories regarding the natural process and have consequently proposed methods to accelerate this process. Kratochvil discloses in U.S. Pat. No. 4,119,732 a process for the manufacture of American cheese which involves the addition of specific pairs of strains of *Lactobacillus plantarum* and *Streptococcus durans* in combination with pre-gastric lipases during the cheesemaking process with subsequent curing of the cheese at elevated temperatures. In U.S. Pat. No. 4,158,607, Kalinowski et al disclose an enzymatic preparation composed of the protease from *Penicillium candidum* or *P. roqueforti* and the autolysate of a lactic acid bacteria from the species *S. lactis* or *L. casei*. International Patent publication No. WO 82/03971 having an international publication date of Nov. 25, 1982, discloses a method of producing a low-fat cheese product which involves inoculating milk with a culture of *L. bulgaricus* and *S. thermophilus* together with a culture of *L. casei* and a normal cheese starter culture. The first two organisms are said to produce the required flavor and rapid fermentation of lactose whereas the *L. casei* assists in the hydrolysis of protein.

British Pat. No. 1,326,516 describes a process for producing a cheese-like flavoring material. A product prepared using this material would not be considered cheddar cheese as that term is used herein as it is close in concept to enzyme modified cheese. The use of a flavoring organism such as *L. lactis* or *L. casei* is described as being optional to this process.

Dooley, in U.S. Pat. No. 4,172,900 describes a composition for addition to cheese milk and/or curd which composition is a blend of a proteolytic enzyme from a viable micrococcus together with pre-gastric lipases and *L. lactis*, *L. bulgaricus* or *L. casei*. This formulation is intended for the enhancement of intensified flavor development rather than accelerated aging.

Roberts, in U.S. Pat. No. 3,650,768 discloses a method of making cheese from heat-treated milk having increased flavor which involves the use of a formulation made up of viable *Micrococcus chon* and pre-gastric lipase together with viable *L. lactis* or *L. bulgaricus*.

SUMMARY OF THE INVENTION

The present invention is a composition for accelerating the aging process of cheese which comprises:

(a) a preserved, partially disrupted preparation of the lactic acid bacteria *L. casei*, *L. lactis* or a mixture thereof; and (b) dried lipase which is an animal, plant or microbial lipase having a specificity similar to that of kid or calf pre-gastric lipase.

Also included within the scope of this invention is a method of accelerating the aging of cheese and/or preventing the development of defects during the aging process using this preparation.

DESCRIPTION OF THE INVENTION

The cheese aging preparation of the present invention can be prepared by providing the major ingredients in a premixed form so that they can be added to the milk during the cheesemaking process. Conversely, the ingredients may be added individually in whatever order is most convenient to the cheesemaker. While not critical, it is preferred that the composition also contain a preserved culture concentrate of cells of bacteria from the species *L. plantarum* at least some of which have been disrupted. This is the case because the addition of partially disrupted *L. plantarum* gives a more balanced cheese profile especially when lipase enzymes are added. The *L. plantarum* reduces the harshness and rancid notes that are characterestic of the action of certain lipase enzymes on milk fat. The amounts and activity of the ingredients to be used are as follows:

| Ingredient | Range | % (W.W) Total Milk |
|---|---|---|
| *L. casei* or *L. lactis* | Preferred | 0.025–0.03% at a standard* protease level (140 PU/g) |
|  | Operable | 0.001–0.05% at a standard protease level (140 PU/g) Based on cell population before |

-continued

| Ingredient | Range | |
|---|---|---|
| | | disruption |
| L. plantarum | Preferred | $1 \times 10^4$–$5 \times 10^6$ CFU/ml of milk** |
| | Operable | $0$–$5 \times 10^7$ CFU/ml of milk |
| | | Grams/454 kg of milk |
| Kid & Calf Lipases*** or animal, plant or microbial lipase having a specificity similar to kid or calf pre-gastric lipase | Preferred | 0.30–0.35 g/454 kg of milk (kid) 0.13–0.18 g/454 kg of milk (calf) |
| | Operable | 0.015–1.0 g/454 kg of milk (kid) 0.0075–0.5 g/454 kg of milk (calf) |
| Neutral Microbial Protease | Preferred | 40,000–160,000 PU/454 kg of milk |
| | Operable | 0–600,000 PU/454 kg of milk |

*Standard Protease Unit (PU) = the amount of enzyme required to cause an increase in adsorbance at 660 nm which is equivalent to the release of 0.1 μmole of tyrosine/hr/ml using a casein solution and the Folin reaction.
**CFU = Colony Forming Units using ATP Agar (Difco Laboratories) for 48 hours at 37° C.
***Kid @ 2,500 RU/g
Calf @ 5,500 RU/g RU=Ramsey units as determined by the assay described in *Journal of Dairy Service*, Vol. 50, (7) p. 1061 (1967). A selected strain of *L. casei* or *L. lactis* (preferably ATCC 39539 or ATCC 39538, respectively) is cultured in a hydrolyzed milk-based growth medium which is fortified with yeast extract and mineral salts. Cell biomass is produced during incubation for 16 to 24 hours at 37° C. while the pH of the medium is controlled to a set point of 6.5 with $NH_4OH$ additions. Cells are separated using centrifugation and the culture concentrate is subjected to milk disruption by several passes in a 2-stage homogenizer at 4,000 PSI or by other methods such as sonication autolysis or enzymatic-lysis such as by lysozyme addition. In a preferred embodiment, the preparation contains *L. casei* or *L. lactis* cells of which approximately 67% are disrupted when subjected to disruption by standard techniques. Total cell disruption is not unsatisfactory but typically, the amount of disruption will be from 20% to 80% for both the *L. casei*, *L. lactis* and *L. plantarum* described below. A preparation of totally disrupted cells could be used, however, by the nature of the methods used, greater cell disruption is commercially impractical due to destruction of the enzymatic activity. Any gentle method of preserving the partially disrupted product, such as freezing, freeze-drying, spray-drying or fluidized bed drying, is acceptable. Preferably, a suitable carrier is added and the complex is spray-dried under conventional conditions.

Frozen or dried culture concentrates of *L. plantarum* are commercially available or can be prepared in a manner as described above for *L. casei*. If a commercial preparation is obtained, it should be mildly disrupted as is the case with *L. casei* and *L. lactis* so that the *L. plantarum* component preferably contains about 23% disrupted cells. The disruption causes the cells to lyse more rapidly and provides more opportunity for enzyme substrate reactions to occur. Our preferred strain of *L. plantarum* is ATCC 39542. Kid lipase and calf lipase are commercially available. Other animal, plant or microbial lipases which have a similar specificity may also be used. 0 Suitable specificity for a particular lipase or combination of lipases can be determined by inoculating varying levels of lipolytic enzyme into a fresh cheddar cheese slurry containing 50°–55° % moisture. This slurry can be incubated at elevated temperatures (30°–37° C.) for varying lengths of time. Organoleptic evaluation must be made on a daily basis to determine acceptability of the free fatty acids balance relative to an aged cheddar cheese balance. As an example, a small quantity of slurry is removed for evaluation periodically throughout the incubation period. Early in the flavor development period, the slurried material can be graded directly without dilution. As the free fatty acid flavor intensifies with time, the slurry can be diluted in low fat milk at 6.0% for grading. This bland milk medium aids as a carrier for improved sensory judgements. Key organoleptic flavor profiles for American-type and soft cheese are in part produced by acceptable lipases which include enzymes that give increased levels of butyric acid providing a cheesey bite flavor. Lipases which liberate intermediate chain length fatty acids such as caproic, caprylic and capric (picante burn) are acceptable at subtle flavor levels for cheddar cheese. These lipases, while known to be useful in cheese manufacture, work synergistically with the particular lactobacillus microorganisms described herein to provide the desired curing of American cheese so as to provide the desired flavor in a shorter time than would be the case without the addition of the fast curing ingredients.

An optional fourth ingredient in the preparation of the present invention is a microbial, neutral protease having specific activity of 650,000 PU/g and used in an amount of from zero to 600,000 protease activity units (PU) per 454 kg of milk as determined by the standard protease assay. Suitable proteases can be obtained from *Bacillus subtilis*, *B. amyloliquefaciens* and *Aspergillus oryzae*.

The known methods of making American cheese involve adding milk (adjusted to a temperature of from 86° F. to 90° F.) to the cheesemaking vat. A starter comprising a lactic acid producing bacteria is added to the milk and stirred as the milk ripens due to the development of acidity through bacterial action. The preparation for accelerated aging described herein is preferably added to the cheese milk before the addition of a coagulant but can also be added to the curd with salt before pressing. Rennet (either animal or microbial in origin) is then mixed thoroughly into the ripened milk and the stirring is stopped whereupon the milk is permitted to sit so as to form a coagulum or curd. When the curd is sufficiently firm, it is cut into cubes which are stirred continuously as the whey is expelled during which time the curd is usually heated over a period of about ½ hour to a temperature of about 102° F. After draining the whey from the curd, the curd is packed several inches deep, and when the curd is firm enough to be turned without breaking, it is cheddared, that is cut into slabs about 7 inches wide, and turned frequently. After cheddaring, the curd is milled and stirred while salt is added. This causes additional whey to be expelled.

After salting and draining, the curd is placed in cloth-lined metal hoops and pressed for several hours to form a cheese. After pressing, the cheese is removed from the hoop and wrapped in a suitable material for curing and aging.

Curing usually requires at least 60 days to provide what is known as young or low-flavored cheese.

Lengthier curing periods of from about 3 to 6 months provide mildly flavored cheddar cheese. Aged cheddar cheese is produced by curing for 6 to 12 months or longer in some cases. While the composition disclosed herein is particularly suited for the accelerated aging of American-type cheese, it can also be used advantageously in the manufacture of Italian cheese such as mozzarella, provolone, parmesan and romano; semi-soft cheeses such as brick, edam and gouda as well as soft cheese such as camenbert and brie. The enzyme preparation of the present invention may also be used in conjunction with the preparation of cheese made from ultrafiltered milk and low fat or low salt cheese.

The lengthy time required for aging results in very substantial space requirements to produce and store large quantities of cheese. Thus, the economic advantages of accelerating the aging process are apparent.

The method of practicing the present invention is further illustrated by the following Examples.

EXAMPLE I

A cheese preparation was prepared by inoculating cheese milk with a preparation of 0.045% (w/w) *L. lactis* ATCC 39538 which had approximately 67% of its cells disrupted and had its enzyme activity standardized using the procedure disclosed in U.S. Pat. No. 4,158,607. In addition to the *L. lactis*, there was added 0.3 g kid and 0.13 g calf lipases/454 pounds of milk, the lipases having respective concentrations of 2500 RU and 5500 RU/g. The inoculated milk and milk which had not been treated with *L. lactis* and the lipases was rendered into cheese by the procedure outline in Example II, infra. The treated cheese milk was designated as coming from Vat 3 whereas that which had not been treated was labeled Vat 1 Control. These cheeses were held at 50° F. and graded at 1, 2, 3 and 6 months. The results of this grading were as follows:

| 1 Month | |
|---|---|
| Vat 1 Control | Control-like typical |
| Vat 3 | Slight improvement |
| 2 Month | |
| Vat 1 Control | Typical |
| Vat 3 | Very slight improvement |
| 3 Month | |
| Vat 1 Control | Typical |
| Vat 3 | Significant improvement in aged flavor |
| 6 Month | |
| Vat 1 Control | Typical flavor |
| Vat 3 | Substantial improvement in aged flavor equivalent to at least a 10 month aged flavor intensity |

EXAMPLE II

To 40,000 pound quantities of cheese milk the following ingredients were added as it was added to a cheese vat:
(1) 0.8% fully-ripened bulk starter containing a high population of *S. cremoris* and *S. lactis*.
(2) 1589.0 g of dried *L. casei* or *L. lactis* having an activity of 480 protease units/g (67% disrupted cells).
(3) 164.0 g of dried *L. plantarum* providing a count to the milk of 5.0×10$^6$ CFU/ml as based on the original culture concentrate count (23% disrupted cells).
(4) powdered calf lipase (6.26 g) from a stock preparation of 5,500 RU/g.
(5) kid lipase (13.12 g) from a stock source having 2,500 RU/g.

The preceding mixture was allowed to ripen for 1 hour after which 328 ml of single-strength calf rennet was added. The proper coagulum was formed within 30 minutes at which point cutting occurred. Standard cheesemaking procedures were followed to provide a cheddared curd which was milled when a pH of 5.40 was reached. The milled curd was salted to provide a finished product containing 1.8% (w/w) salt. The finished hooped curd had a final moisture content of 37.5% and fat content of 33.0%. The blocks were shrink film wrapped and aged at 50° F. for 3 months which results in the production of a typical aged (6 months) cheddar cheese flavor. Longer aging at 50° F. results in strongly aged cheddar cheese flavors which simulate 12 month flavors with only 6 month storage.

The flavor development rate can be substantially reduced by lowering the aging temperature from 50° F. to 40° F. or below.

EXAMPLE III

To 40,000 pound quantities of cheese milk the following ingredients were added as the milk was added to a cheese vat:
(1) 0.8% fully-ripened bulk starter containing a high population of *S. cremoris* and *S. lactis*.
(2) 1589.0 g dried *L. casei* or *L. lactis* having an activity of 480 protease units/g.
(3) dried *L. plantarum* providing a count to the milk of 5.0×10$^6$ CFU/ml as based on the original culture concentrate count.
(4) powdered calf lipase (6.26 g) from a stock preparation of 5,500 RU/g.
(5) kid lipase (13.12 g) from a stock source of lipase having 2,500 RU/g activity.
(6) 10.0 g of protease from *B. amyloliquefaciens* (dry powder having an activity of 650,000 PU/g).

The mixtures of special starters, enzymes and milk are allowed to ripen for 1 hour after which 93.7 g rennet powder (315%) is added for clotting purposes. The desired coagulum was formed within 30 minutes at which time cutting took place. Following standard cheesemaking procedures, the cheddared curd was milled when a pH of 5.40 was reached. The milled curd was salted to give a finished product of 1.8% salt and the finished hoop curd had a final moisture content of 37.5% and fat of 33.0%. The blocks were wrapped in shrink film and aged at 50° F. for 3 months during which time a typical aged (6 month) cheddar cheese flavor is produced. This product can be further aged at 50° F. resulting in strongly aged cheddar cheese flavors simulating 12 month flavors with only 6 month storage. The flavor development rate can be substantially reduced by lowering the aging temperature from 50° F. to 40° F. or below.

EXAMPLE IV

A cheese ripening formulation according to the present invention was prepared by dry blending the following components:
i. *Lactobacillus casei* (ATCC 39539) 0.157% (w/w of curd) @ 140 PU/g of which approximately 67% of the cells had been disrupted;
ii. Neutral microbial protease obtained from *Bacillus amyloliquefaciens* @ 1690 PU/kg of curd;
iii. *L. plantarum* (ATCC 39542) of which approximately 23% of the cells had been disrupted @

$5.63 \times 10^{10}$ CFU (prehomogenization) per kg of curd;

iv. Kid lipase @ 6.15 RU/kg of curd; and v. Calf lipase @ 6.71 RU/kg of curd.

Drained stirred curd was prepared from a vat of milk by taking the following steps:

a. Starter 0.75%, 60 minutes incubation @ 32° C.

b. Coagulant 3 oz./1000 lb. of milk, 30 minutes incubation @ 32° C.

c. Cut with ¼ inch knives.

d. Allow curd to firm for 15 minutes prior to stirring and cooking.

e. Begin cooking-ramping temperature from 32° to 38°-39° C. within 30 minutes.

f. Drain whey @ pH 6.2.

g. Continuously stir drained curd while pH is dropping.

When the pH of the curd had reached 5.7 the cheese ripening formulation was introduced thereto by pre-blending it with the standard amount of salt (500 g/44 lb. of finished product) and then evenly adding the mixture to the stirred curd particles. The cheese was finished in the usual manner. A control was prepared in a similar manner except that no cheese ripening formulation was added with the salt. The control was designated #1 Control whereas the curd to which had been added the cheese ripening formulation was designated #11 ripening blend. The grading of these cheeses which had been held at 50° F. was at 1, 2, 3 and 6 months. The results of this grading were as follows:

| 1 Month | |
|---|---|
| #1 Control | Good flavor balance, creamy typical one month flavor |
| #11 Ripening Blend | Slight openness, sour, not as balanced, high intensity |
| 2 Months | |
| #1 Control | Good body, clean, typical, sour, slight sweet, creamy flavor |
| #11 Ripening Blend | Good background flavor, good sour, like a 4-5 month old sharp cheddar cheese |
| 3 Months | |
| #1 Control | Typical, no off flavors |
| #11 Ripening Blend | Very good cheese, flavor of a 6-8 month quality cheddar cheese |
| 6 Months | |
| #1 Control | Unclean, slight musty/planty flavor, slight harshness |
| #11 Ripening Blend | Very intense flavor, excellent quality cheddar flavor development, good cheese, 12-16 month quality cheese |

EXAMPLE V

A cheese ripening formulation according to the present invention was prepared by dry blending the following components:

i. *L. casei* (ATCC 39539) 0.035% w/w total milk @ standard 140 PU/g protease level;

ii. *L. plantarum* @ $5 \times 10^5$ CFU/ml milk (prehomogenization; and iii. *Mucor miehei* 4562 RU/454 kg of milk which is 2.5 X equivalent of the total RU of kid/calf lipase The microbial lipase from *M. miehei* was determined to have a specifity similar to that of kid/calf pre-gastric lipase by the organoleptic evaluation of innoculated cheese slurries as previously described.

The formulation was added to the cheese by introducing it to the cheese milk and the cheese, as well as a Control with no ingredients for accelerated ripening, prepared as previously described. Slight to moderate improvement in flavor developed in the treated cheese as compared to the Control during the first two months of aging. However, by the third through the sixth month evaluation, 6-12 month respective flavors had developed in the treated cheese. This flavor appeared to be very similar to the standard accelerated ripened cheese when kid/calf lipases were used.

While a curing temperature of 50° F. is preferred, a temperature range of 36° to 60° F. is suitable. In addition to accelerating the aging process, the preparation of the present invention has been found to prevent the development of defects in the cheese during the aging process. It has been observed in the typical day to day manufacturing of cheddar cheese that there are many variables which will influence the development of off-flavors. In the numerous field trials associated with this ripening system, the control vat of cheese on occasion has produced bitter, sulfur and/or out of balance, fruity, rancid flavor defects. These defects may be recognized at low levels after 1 to 2 months aging or, in some cases, after 3 to 6 months. Generally once these off-flavors are observed, they intensify very quickly. The experimental vats produced on the same day using the identical ingredients and cheesemaking procedures as the control, scored very well in flavor evaluation.

Specific trials have been conducted where strongly bitter starter cultures have been intentionally used which resulted in bitter cheese within 2 months. Those vats containing the accelerated ripening system of the present invention have not produced this defect even when aged for 6 months and beyond.

While the formulation of the present invention is particularly useful for accelerating the ripening of American-type cheese, it can also be effectively used to accelerate the ripening of soft cheeses. This is the case because the preparation accelerates the natural aging process of cheese without imparting a unique characteristic of its own. The preparation allows the cheese to maintain its own individual natural flavor characteristics so the identity of the particular cheese is maintained.

What is claimed is:

1. A composition for accelerating the aging process of cheese which consists essentially of:

(a) a preparation of the lactic acid bacteria *L. casei* ATCC 39539 or *L. lactis* ATCC 39538 or a mixture thereof which has been preserved by freezing, freeze-drying, spray drying or fluidized bed drying and wherein at least 20% of the cells of the lactic acid bacteria preparation have been disrupted; and (b) a dried lipase which is an animal, plant or microbial lipase having a specificity similar to that of kid or calf pre-gastric lipase.

2. The composition of claim 1 wherein the preserved lactic acid bacteria is freeze-dried *L. casei*.

3. The composition of claim 1 wherein the preserved lactic acid bacteria is freeze-dried *L. lactis*.

4. The composition of claim 1 which also contains a culture concentrate of *L. plantarum* ATCC 39542 which as been preserved by freezing, freeze-drying, spray-drying or fluidized bed drying and wherein at least 20% of the *L. plantarum* cells have been disrupted.

5. The composition of claim 4 wherein the preserved *L. plantarum* is in the freeze-dried form.

6. The composition of claim 1 wherein there is included a microbial neutral protease having a specific activity of 650,000 PU/g and is present in an amount of sufficient to provide up to 600,000 protease activity units per 454 kg of cheese milk.

7. The composition of claim 1 wherein the lipase is pre-gastric calf or kid lipase or a blend thereof.

8. In the method of making cheese which involves adding a coagulant to milk to cause it to coagulate and separate into solid curd and liquid whey with salt being added to the curd in a subsequent step in the cheesemaking process after which the curd is pressed to remove excess whey and then allowed to age to form cheese, the improvement which comprises accelerating the aging of the curd to form cheese by the steps of:
 (a) adding to the milk before the addition of the coagulant or adding to the curd with salt before pressing, a composition which consists essentially of:
  i. a preparation of the lactic acid bacteria *L. casei* ATCC 39539 or *L. lactis* ATCC 39538 or a mixture thereof which has been preserved by freezing, freeze-drying, spray-drying or fluidized bed drying and wherein at least 20% of the cells of the lactic acid bacteria preparation have been disrupted; and
  ii. a dried lipase which is animal, plant or microbial lipase having a specificity similar to that of kid or calf pre-gastric lipase; and
 (b) allowing the curd to ripen at a temperature of from 36° to 60° F. to thereby obtain an aged cheese in a shortened period of time.

9. The method of claim 8 wherein the preserved lactic acid bacteria is freeze-dried *L. casei*.

10. The method of claim 8 wherein the preserved lactic acid bacteria is freeze-dried *L. lactis*.

11. The method of claim 8 wherein the composition also contains a preserved culture concentrate of partially disrupted cells of *L. plantarum* ATCC 39542 which has been preserved by freezing, freeze-drying, spray-drying or fluidized bed drying and wherein at least 20% of the *L. plantarum* cells have been disrupted.

12. The method of claim 11 wherein the preserved *L. plantarum* is in the freeze-dried form.

13. The method of claim 8 wherein the *L. casei*, *L. lactis* or mixture thereof is present in an amount of form 0.001 to 0.05 weight percent of the milk used in the cheese manufacture and has an activity of 140 standard protease units per gram of bacteria.

14. The method of claim 13 wherein the amount is from 0.025 to 0.03 weight percent.

15. The method of claim 11 wherein the *L. plantarum* is present in an amount of from $1 \times 10^4$ to $5 \times 10^7$ CFU per milliliter of milk used in the cheese making process based on the cell population of *L. plantarum* before disruption.

16. The method of claim 8 wherein the composition includes a microbial neutral protease having a specific activity of 650,000 PU/g in an amount sufficient to provide up to 600,000 protease activity units per 454 kg of milk used in the cheese manufacture.

17. The method of claim 8 wherein the lipase is pre-gastric kid lipase and is used in an amount equivalent to 0.015 to 1.0 gram per 454 kg of milk used in the cheese manufacture based on the kid lipase having an activity of 2,500 Ramsey Units (RU) per gram.

18. The method of claim 17 wherein the amount of kid lipase is from 0.30 to 0.35 g/454 kg of milk.

19. The method of claim 8 wherein the lipase is pre-gastric calf lipase and is used in an amount equivalent to 0.0075 to 0.5 gram per 454 kg of milk used in the cheese manufacture based on the calf lipase having an activity of 5,500 Ramsey Units (RU) per gram.

20. The method of claim 19 wherein the amount of calf lipase is from 0.13 to 0.18 g/454 kg of milk.

* * * * *